Sept. 5, 1950 F. L. STUCK 2,521,423

MINIATURE RADIO RECEIVER

Filed May 8, 1947 2 Sheets-Sheet 1

INVENTOR.
F. L. STUCK

BY

A. Yates Dowell
ATTORNEY

Sept. 5, 1950 F. L. STUCK 2,521,423

MINIATURE RADIO RECEIVER

Filed May 8, 1947 2 Sheets-Sheet 2

INVENTOR.
F. L. STUCK

BY

A. Yates Dowell
ATTORNEY

Patented Sept. 5, 1950 2,521,423

UNITED STATES PATENT OFFICE 2,521,423

MINIATURE RADIO RECEIVER

Frank L. Stuck, Lakeland, Fla.; Iva M. Stuck, executrix of Frank L. Stuck, deceased, assignor to Electronics Systems Corp., a corporation of Missouri Application May 8, 1947, Serial No. 746,702

4 Claims. (Cl. 250—14)

This invention relates to miniature portable radio receivers and more particularly to a relatively small, lightweight, self contained battery operated radio receiving set adapted to be conveniently carried in the lapel, vest pocket or other pocket of the user without inconvenience or discomfort.

Heretofore numerous attempts have been made to produce a satisfactory small pocket radio but these attempts have not been successful and the result usually has been a relatively large receiver too heavy and cumbersome to be conveniently and comfortably carried in the pocket of the user. Also the resulting radios lacked sufficient sensitivity to be practical. Among the difficulties encountered have been the inability to provide sufficiently small and compact tuning structure and in connection with the other parts of the radio.

It is accordingly an object of the invention to provide a small lightweight portable radio receiver adapted to be conveniently and comfortably carried in the pocket of the user.

Another object of the invention is to provide a relatively small novel tuning and circuit structure capable of being used in a miniature portable radio and determining to a large degree the size of the radio.

A further object of this invention is to provide a small portable pocket radio receiver incorporating a novel circuit arrangement in which the volume control serves as an on-off switch for the A and B batteries.

Another object of this invention is to provide a small portable pocket radio receiver which may be easily and cheaply constructed by large scale production methods and which will be sufficiently rugged to withstand the rough usage to which it may be subjected.

Figures 1, 2, 3:
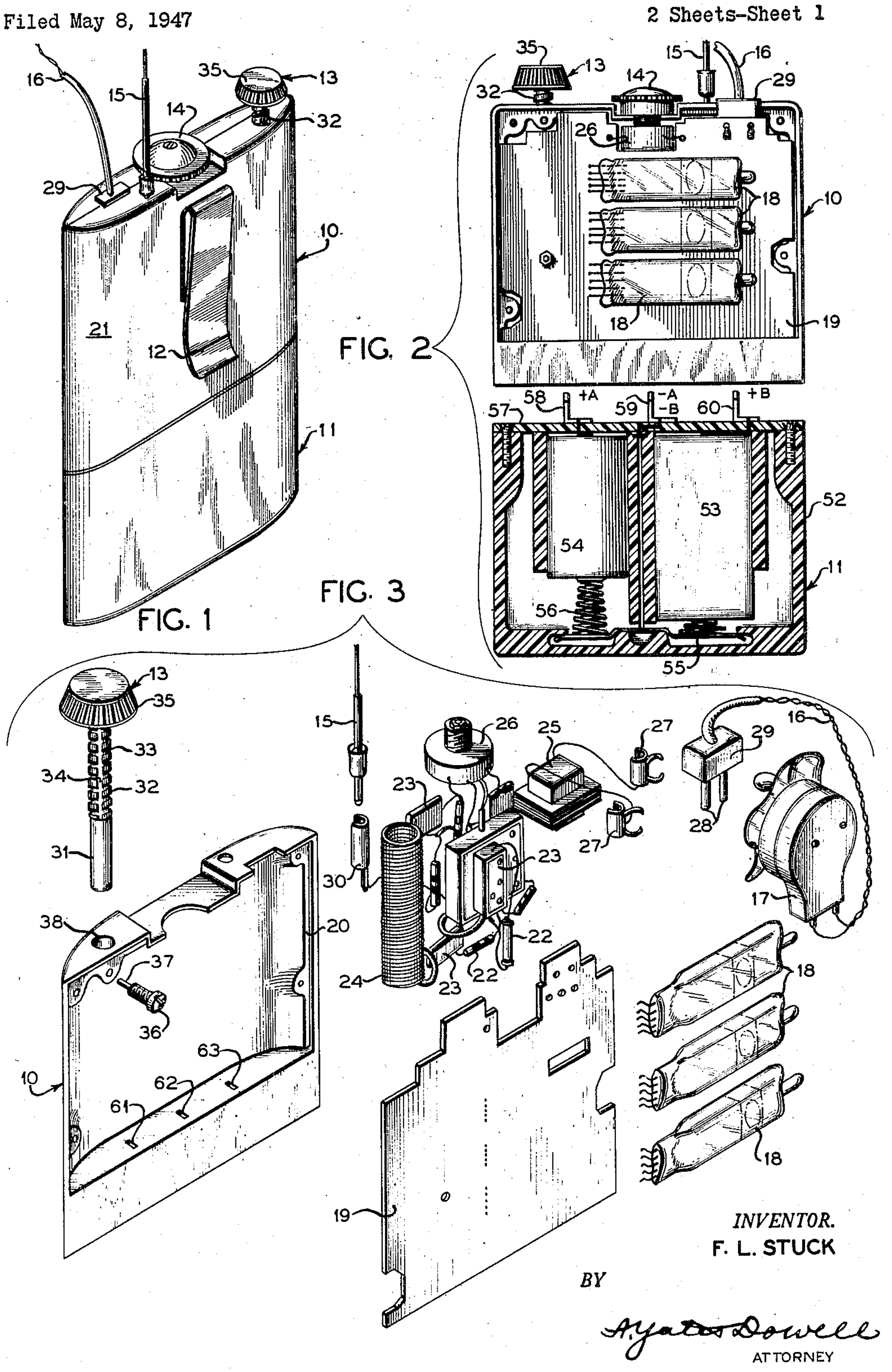
Figures 4, 5, 6, 7:
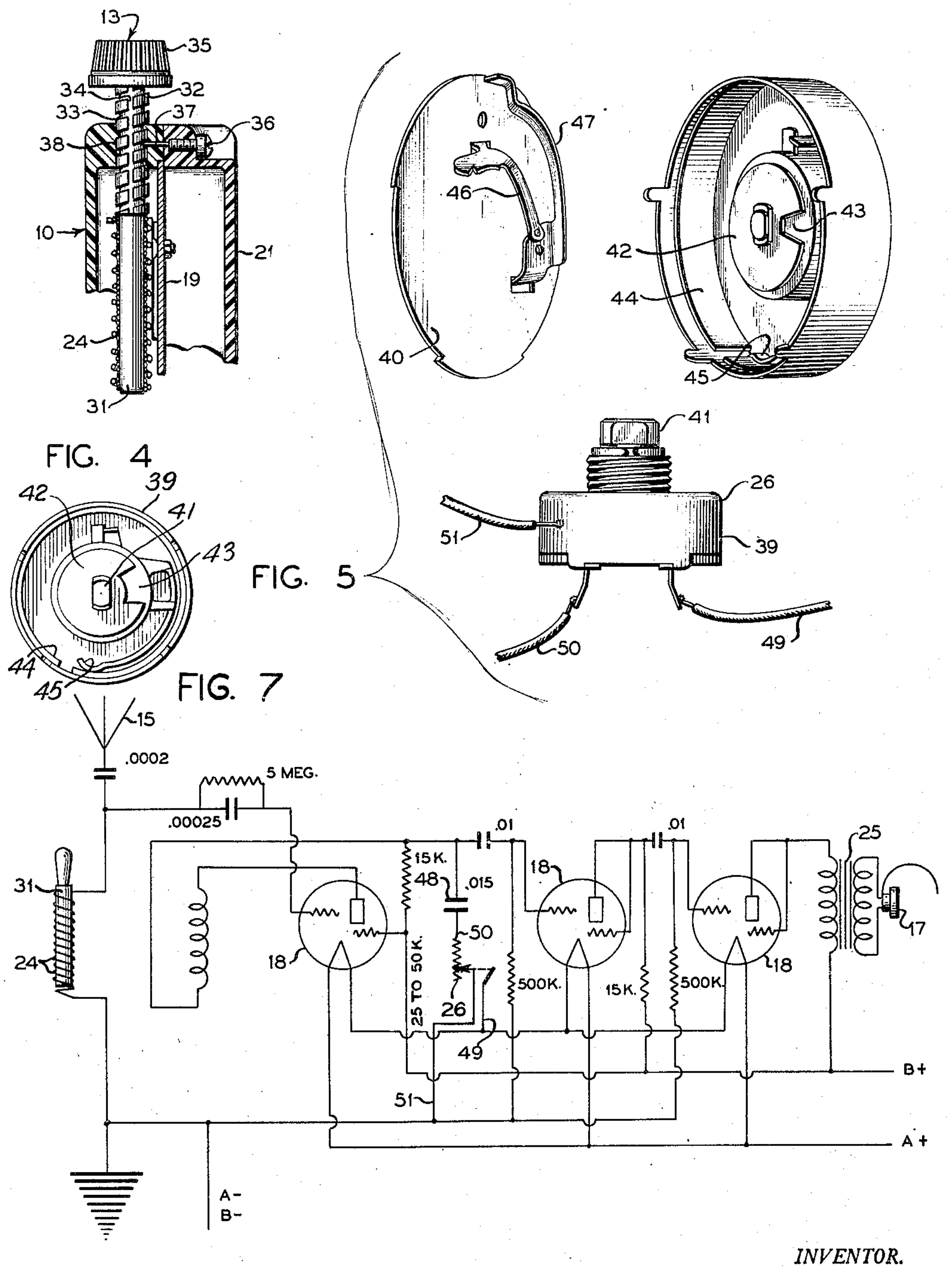

Further objects and advantages of the invention will be apparent from the following description taken in conjunction with the drawings, wherein:

Fig. 1 is a perspective of a complete radio receiver illustrating one embodiment of the present invention;

Fig. 2, a front elevation partially in section and with the front cover plate removed;

Fig. 3, an exploded view showing the receiver components but with the batteries and battery container omitted;

Fig. 4, a sectional elevation illustrating the details of the tuning structure;

Fig. 5, detail view of the volume control in assembled condition and with the cover plate removed to show the internal structure thereof;

Fig. 6, a circuit diagram of the receiving set; and

Fig. 7, an elevational view showing the internal structure of the control.

In Fig. 1 is illustrated a radio receiver having a case 10 which houses the receiver components, and a case 11 removably attached thereto which contains the necessary batteries. The cases 10 and 11 may be formed of molded plastic or similar material and there is provided on the case 10 a spring clip 12 which is adapted to engage the user's pocket and prevent accidental displacement therefrom. A tuning control 13 and a volume control 14 project from the top of case 10 and attaching clips or jacks for antenna 15 and earphone cable 16 are also provided therein. The antenna 15 may comprise either a relatively short stiff rod of small diameter or a single wire of any desired length. A conventional hearing aid earphone 17, shown in Fig. 3, may be connected through a cable 16 to the receiver, thus providing comfortable audible reception even though there is considerable noise around the user.

In Figs. 2 and 3 there is illustrated the internal construction of the receiver which employs three vacuum tubes 18 of the miniature type. Tubes 18 are mounted on a subpanel 19 of insulating material which may be positioned on a shoulder 20 within the case 10 and be held in place by a removable cover plate 21. The various other components of the receiver such as the resistors 22, condensers 23, tuning inductance 24, output transformer 25 and volume control 26 are also mounted on the subpanel 19 and may be removed from the case 10 as a unit in order to facilitate service and repairs or for other reasons.

Clips 27 are also secured to the subpanel 19 and receive the prongs 28 of the plug 29 on the cable 16 which serves to connect the earphone during operation of the receiver. When the earphone and cable are not in use, they may be disconnected and carried in the pocket. Clip 30 is also mounted within the case 10 and serves to removably receive the antenna 15.

The novel tuning arrangement employed in this receiver comprises a coil 24 mounted on the subpanel 19, the inductance of which may be varied by changing the position of a movable core 31 mounted for movement within the coil. This is commonly termed "permeability tuning" the novel features of which in this instance are provided by the particular manner in which the core or slug 31 is moved to provide rough or vernier tuning adjustments.

The core 31 may be molded of powdered iron or the like and mounted on the end of a rod 32 of plastic or other insulating material. The rod 32 is also provided with threads 33, a longitudinal groove 34, and an adjusting knob 35.

As best shown in Fig. 4, a screw 36, having a reduced end portion 37, is threadedly received in the case 10. The rod 32 is slidably and rotatably received in an aperture 38 in the case 10, the threads 33 being engaged by the reduced end portion 37 of the screw 36. It will thus be apparent that rotation of knob 35 will cause inward and outward longitudinal movement of the core 31 depending on the direction of rotation as the result of coaction between the threads 32 and screw 36, thereby producing the desired adjustment by rotation of the knob 35, whether fine or vernier adjustment of the core 31 is desired.

There is also provided means whereby a quick change from one frequency to another may be accomplished as for instance when it is desired to change from a station at one end of the frequency band to a station at the other end. To facilitate this quick change or rough tuning adjustment, there is provided in the rod 32 a longitudinal groove 34 which in one angular position of adjustment registers with and receives the reduced end portion 37 of the screw 36. In this position the rod 32 may be moved axially until a position relatively close to the desired station is obtained at which time the knob 35 may be rotated, thus causing engagement of the projection 37 on the screw 36 with the threads 32 to obtain a fine or vernier adjustment thus accurately tuning to the desired frequency.

If desired indicating means, not shown, may be applied to the rod 32 to indicate the frequency to which the receiver is tuned such as alternately coloring the rod 32.

It will of course be understood that the coil 24 and core 31 will be so proportioned that movement of the core within the limits thereof will result in tuning the receiver over the desired band of frequencies as, for instance, the standard broadcast band.

In Fig. 6 there is shown the circuit diagram of the radio receiver of this invention and basically this circuit comprises a conventional regenerative detector and two stages of audio amplification. While the tuning arrangement as described above is considered novel, this particular arrangement has no bearing on the circuit details per se except that the use of such tuning arrangement eliminates the use of a tuning condenser for the coil 24, thus resulting in saving the space normally occupied by such a condenser.

The circuit however has been modified to permit the use of a combination A battery switch volume and regeneration control. The control used is shown in detail in Fig. 5 and is similar to a conventional potentiometer having a shell or casing 39, a backplate 40 of insulating material, a rotatable shaft 41 extending through the shell 39 centrally thereof, a metallic plate 42 having a notch 43 therein, said plate being fixed to the shaft 41 for rotation therewith, a resistance element 44 mounted within the casing 39 and a movable contact member 45 mounted for rotational movement in response to the rotation of the shaft 41. There is also provided on the rear plate 40 a spring contact member 46, the inner end of which is adapted to engage the rotatable metallic plate 42 except at such times as the notch 43 in the plate 42 is in registry with the contact member 46. There is also a further contact member 47 secured to the rear plate 40, this contact 47 serving as a connection with the movable contact 45.

It will thus be seen that after the contact 46 and rotatable plate 42 are connected in an electrical circuit that these two members will form a switch which will be in the off position when the contact 46 registers with the slot 43 and will be in the on position at all other times.

In order to utilize such a control in the circuit of Fig. 6, it is necessary to provide a blocking condenser 48 which isolates the plate voltage in the plate circuit of the first vacuum tube 18, since, in such a circuit, the regeneration and volume control is connected between the plate circuit and ground, the condenser 48 being normally located between the control and ground rather than between the control and the plate circuit. However, since the filament or A voltage in this particular circuit also flows through the movable arm of the control, it is necessary to isolate the plate voltage therefrom in order to prevent burning out the filaments of the vacuum tubes and as a consequence, blocking condenser 48 is located between the control and the plate circuit to accomplish this purpose, the resulting operation of the circuit being otherwise unaffected thereby. Lead 49 to contact 46, lead 50 to contact 47, and lead 51 to the case 39 of the control 26 correspond to the leads 49, 50, and 51 in the circuit diagram of Fig. 6, and it is also to be noted that in the arrangement of the components as shown in Fig. 3 that the case 39 of the control 26 also serves as a common ground point for all the components in the receiver.

It will thus be seen that by making possible the utilization of a combined switch, volume control and a regeneration control, such as that described above, that it is thus possible to eliminate the usual switch which is applied to the back of the conventional control and thus save the space normally occupied by such a switch.

In order to supply power for operation of the receiver, there is provided a battery pack shown in detail in Fig. 2 and comprising a container 52 housing B battery 53 and A battery 54, which are held in place while maintaining good contact by springs 55 and 56 respectively. The container 52 is closed by a removable cover plate 57 which also is provided with contacts 58, 59, and 60. These contacts are received in slots 61, 62, and 63 shown in Fig. 3, such slots containing jacks or clips which resiliently grip contacts 58, 59, and 60 and removably secure the battery pack to the case 10.

It will be seen from the above detailed description of this invention that applicant has provided novel components in a circuit of more or less conventional design by being able to construct a pocket radio receiver of extremely small and compact proportions and resulting in a receiver having the inherent sensitivity of the regenerative detector and providing by means of a two-stage audio amplifier sufficient volume to provide clear and comfortable radio signals.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A miniature radio receiver comprising an apertured case of a configuration to fit the pocket of the user, tuning and volume controls exposed externally of said case, a radio receiver within said case, a power source for said receiver comprising A and B batteries, a container for said batteries, conducting means detachably connecting said container to said case, tuning means for said receiver comprising a coil and a movable core of magnetic material, means for moving said core comprising a threaded rod of insulating material attached to said core and having a longitudinal groove, said rod being slidably and rotatably received in the aperture in said case, a screw threadedly received in said case and having a reduced end portion extending into said aperture and engaging the threads on said rod whereby upon rotation of said rod said core will be moved inwardly or outwardly in response to coaction between said threads and the reduced end of said screw, thus varying the inductance of said coil to tune said receiver to the desired frequency and whereby upon registration of said reduced end portion with said longitudinal groove said rod may be moved axially resulting in a quick tuning adjustment, said tuning arrangement resulting in the reduction of space ordinarily required for a tuning condenser thus making it possible to construct an extremely small receiver.

2. A tuning arrangement comprising a coil, means for securing said coil in fixed position, a core of magnetic material movably located within said coil, means for moving said core comprising a threaded longitudinally grooved rod of nonconducting material secured to said core, a screw having a reduced end portion engaging the threads on said rod whereby upon rotation of said rod said core will be moved inwardly and outwardly of said coil in response to coaction between said threads and said reduced end portion and whereby upon registration of said reduced end portion with the longitudinal groove said rod may be moved axially to obtain a quick rough adjustment of said core.

3. A miniature radio receiver comprising a case having an aperture, tuning and volume controls extending externally of said case, an earphone cable and antenna means detachably mounted on said case, a power source for said receiver comprising A and B batteries, a container for said batteries, conducting means detachably connecting said container to said case, tuning means for said receiver comprising a coil and a movable core of magnetic material, means for moving said core comprising a threaded longitudinally grooved rod of insulating material attached to said core, said rod being slidably and rotatably received in said aperture, a screw threadedly received in said case and having a reduced end portion extending into said aperture and engaging the threads on said rod whereby upon rotation of said rod said core will be moved inwardly or outwardly by coaction between said threads and the reduced end of said screw thus varying the inductance of said coil to tune said receiver to the desired frequency and whereby upon registration of said reduced end portion with said longitudinal groove said rod may be moved axially resulting in a quick tuning adjustment, a combined electrically connected A battery switch, volume and regeneration control comprising a resistance element connected to the detector plate circuit through a blocking condenser, a movable contact carried by a shaft and engaging said resistance element said shaft being connected to ground, a metallic notched plate fixed to said shaft for movement therewith, a spring contact connected to an A battery circuit and engaging said plate to complete said A battery circuit in one position thereof and engaging said notch to open said A battery in another position thereof, said blocking condenser serving to isolate the plate voltage from said control and said A battery circuit, said combined switch, volume and regeneration control means and said tuning arrangement resulting in the elimination of additional space consuming components and providing an extremely small receiver.

4. A miniature radio receiver comprising a case of a configuration to fit the pocket of the user, clip means on said case for attachment to said pocket, tuning and volume controls exposed externally of said case, a radio receiver within said case, earphone cable and antenna means detachably mounted on said case, a power source for said receiver comprising A and B batteries, a container for said batteries, conducting means detachably connecting said container to said case, a combined electrically connected A battery switch, volume and regeneration control comprising a resistance element connected to the detector plate circuit through a blocking condenser, a movable contact carried by a shaft and engaging said resistance element said shaft being connected to ground, a metallic notched plate fixed to said shaft for movement therewith, a spring contact connected to an A battery circuit and engaging said plate to complete said A battery circuit in one position thereof and engaging said notch to open said A battery in another position thereof, said blocking condenser serving to isolate the plate voltage from said control and said A battery circuit, said combined switch, volume and regeneration control means resulting in the reduction of space ordinarily occupied by the A battery switch, thus making it possible to construct an extremely small receiver.

FRANK L. STUCK.

REFERENCES CITED

The following references are of record in the file of this patent:

UNITED STATES PATENTS

| Number | Name | Date |
|---|---|---|
| 1,048,599 | Smith | Dec. 31, 1912 |
| 1,193,672 | De Groot | Aug. 8, 1916 |
| 1,467,039 | Hume | Sept. 4, 1923 |
| 1,750,032 | Timtiman | Mar. 11, 1930 |
| 1,767,751 | Flewelling | June 24, 1930 |
| 1,794,025 | Magee | Feb. 24, 1931 |
| 2,021,649 | Dow | Nov. 19, 1935 |
| 2,258,652 | James | Oct. 14, 1941 |

OTHER REFERENCES

Radio News Magazine, Oct. 1937, page 202.